United States Patent [19]

Ohdaira et al.

[11] Patent Number: 4,670,508
[45] Date of Patent: Jun. 2, 1987

[54] THERMOPLASTIC RESIN COMPOSITION

[75] Inventors: Akio Ohdaira; Michiharu Suga, both of Iwakuni; Akifumi Kato, Otake; Toshio Kobayashi, Ichihara; Akira Yokoyama, Otake, all of Japan

[73] Assignee: Mitsui Petrochemical Industries Ltd., Tokyo, Japan

[21] Appl. No.: 688,400

[22] Filed: Jan. 2, 1985

[30] Foreign Application Priority Data

Jan. 6, 1984 [JP] Japan ............................... 59-249
May 16, 1984 [JP] Japan ............................. 59-96584

[51] Int. Cl.$^4$ .................... C08L 59/00; C08L 67/00; C08L 69/00; C08L 77/00
[52] U.S. Cl. ................................ 525/64; 525/66; 525/67; 525/68; 525/146; 525/148; 525/154; 525/177; 525/184; 525/285; 524/495; 524/496; 524/502; 524/504
[58] Field of Search .................. 525/64, 66, 68, 67, 525/285, 146, 154, 177, 184

[56] References Cited

U.S. PATENT DOCUMENTS

| | | | |
|---|---|---|---|
| 3,250,823 | 5/1966 | Zeitlin | 525/66 |
| 3,769,260 | 10/1973 | Segal | 525/177 |
| 4,305,865 | 12/1981 | Okada et al. | 525/66 |
| 4,317,764 | 3/1982 | Shier | 524/449 |
| 4,362,846 | 12/1982 | Korber et al. | 525/66 |
| 4,381,366 | 4/1983 | Sanderson et al. | 524/504 |

FOREIGN PATENT DOCUMENTS 7141456 12/1971 Japan ............................. 525/177

OTHER PUBLICATIONS

Chemical Engineering-Characteristics of Fine Particles-p. 207, Jun. 11, 1962.

*Primary Examiner*—Carman J. Seccuro
*Attorney, Agent, or Firm*—Armstrong, Nikaido, Marmelstein & Kubovcik

[57] ABSTRACT

A thermoplastic resin composition comprising a melt mixed product of (A) 70% to 98% by weight of at least one thermoplastic resin selected from the group consisting of polyamides, polyacetals, polyesters, and polycarbonates and (B) 30% to 2% by weight of ultra-high molecular weight polyolefin powder having an intrinsic viscosity [$\eta$] of 10 dl/g or more, measured in decalin at 135° C., and having an average particle size of 80 $\mu$m or less and having a particle size distribution such that substantially all of the powder particles pass through a sieve having a sieve number of 100 and at least 20% by weight of the total powder particles pass through a sieve having a sieve number of 350.

This thermoplastic resin composition has excellent abrasion resistance, excellent impact resistance, and a high critical PV value.

5 Claims, No Drawings

THERMOPLASTIC RESIN COMPOSITION

BACKGROUND OF THE INVENTION

1. Field of the Invention

The present invention relates to a thermoplastic resin composition having excellent abrasion resistance, excellent impact resistance, and a high critical PV value. More specifically, it relates to a critical PV value. More specifically, it relates to a thermoplastic resin composition containing fine powder particles of ultra-high molecular weight polyolefin (e.g., polyethylene). The present invention also relates to modified ultra-high molecular weight polyolefin powder having good affinity to and dispersibility in thermoplastic resins and good adhesion properties to metals and resins.

2. Description of the Related Art

Thermoplastic resins having excellent mechanical strength and abrasion resistance, such as polyamides, polyacetals, polyesters, and polycarbonates, have been heretofore used for mechanical parts such as bearings and gears. However, these thermoplastic resins have disadvantages in that, when compared with conventional metallic materials such as brass and other copper alloys, their critical PV value (i.e., the critical value of a load at which a bearing material will heat-melt and seize at a constant load (P) and velocity (V), or more) is low.

Various attempts have been made to improve the critical PV values of the above-mentioned thermoplastic resins. For example, Japanese Examined Patent Publication (Kokoku) No. 46-41456 proposes the blending of the thermoplastic resins with powdered high density polyethylene, to improve the critical PV values. However, in the above-mentioned blended thermoplastic resins, there remain the disadvantages of poor dispersibility in the thermoplastic resins, an insufficient improvement of the critical PV values, and poor mechanical strength, due to the high viscosity and large particle sizes of these materials.

SUMMARY OF THE INVENTION

Accordingly, an object of the present invention is to eliminate the above-mentioned disadvantages of the prior art and to provide a thermoplastic resin composition having a high critical PV value and excellent mechanical strength, especially excellent impact resistance and abrasion resistance.

Another object of the present invention is to provide modified an ultra-high molecular weight polyolefin powder suitable for use as a resin modifier and for use as an adhesive, coating composition, and inorganic filler compounded molding material.

Other objects and advantages of the present invention will be apparent from the following description.

In accordance with the present invention, there is provided a thermoplastic resin composition comprising a melt mixed product of (A) 70% to 98% by weight of at least one thermoplastic resin selected from the group consisting of polyamides, polyacetals, polyesters, and polycarbonates, and (B) 30% to 2% by weight of an ultra-high molecular weight polyolefin powder having an intrinsic viscosity [η] of 10 dl/g or more, measured in decalin at 135° C., having an average particle size of 80 μm or less, and having a particle size distribution such that substantially all of the powder particles will pass through a sieve having a sieve mesh number of 100 (i.e., "JIS (Japanese Industrial Standard) mesh", hereinbelow) and at least 20% by weight of the total powder particles will pass through a sieve having a sieve mesh number of 350.

In accordance with the present invention, there is also provided a modified ultra-high molecular weight polyolefin powder having an average powder particle size of 1 to 80 μm and having such a particle size distribution such that at least 20% by weight of the total powder particles passes through a sieve having a sieve mesh number of 350, this polymer being modified by graft copolymerizing unsaturated carboxylic acid derivative units derived from an unsaturated carboxylic acid or the acid anhydride, the salt, or the ester thereof to ultra-high molecular weight polyolefin having an intrinsic viscosity [η] of 10 dl/g or more, measured in decalin at 135° C. This modified ultra-high molecular polyolefin powder is extremely suitable for use as component (B) of the above-mentioned thermoplastic resin composition.

DESCRIPTION OF THE PREFERRED EMBODIMENTS

Thermoplastic resins usable as component (A) in the present thermoplastic resin compositions are polyamides, polyacetals, polyesters, and polycarbonates.

The polyamides usable in the present thermoplastic resin compositions are those obtained from polycondensation of aliphatic, alicyclic, and aromatic diamines such as hexamethylene diamine, decamethylene diamine, dodecamethylene diamine, 2,2,4- or 2,4,4-trimethylhexamethylene diamine, 1,3- or 1,4-bis (aminomethyl) cyclohexane, bis (p-aminocyclohexyl) methane, and m- or p-xylylene diamine with aliphatic, alicyclic, and aromatic dicarboxylic acids such as adipic acid, suberic acid, sebacic acid, cyclohexane dicarboxylic acid, terephthalic acid, and isophthalic acid, and those obtained from condensation of lactams such as ε-caprolactam and ω-laurolactam as well as copolyamides obtained from the above-mentioned compounds. These polyamides can be used alone or in any mixture thereof in the present thermoplastic resin composition.

Typical examples of the above-mentioned polyamides are nylon 6, nylon 66, nylon 610, nylon 9, nylon 11, nylon 12, nylon 6/66, nylon 66/610, and nylon 6/11. Of these polyamides, the use of nylon 6 and nylon 66 having a high melting point and stiffness is preferable. Although there is no specific limitation in the molecular weight of the polyamide used in the present invention, the polyamides having a relative viscosity $\eta_r$, determined in 98% sulfuric acid according to JIS K6810, of 0.5 or more, especially 2.0 or more, are preferably used in the present invention.

The polyacetals usable in the present thermoplastic resin compositions are crystalline thermoplastic resins, sometimes called polyoxymethylene. Examples of these polyacetals are formaldehyde homopolymers and copolymers of trioxane (i.e., trimer of formaldehyde) and a small amount of cyclic ethers such as ethylene oxide and 1,3-dioxane. These polyacetals can be used alone or in any mixture thereof in the present thermoplastic resin composition.

The polyesters usable in the present thermoplastic resin compositions are crystalline thermoplastic resins formed from dihydroxy compound units derived from at least one compound selected from the group consisting of aliphatic glycols such as ethylene glycol, propylene glycol, 1,4-butanediol, neopentyl glycol, and hexamethylene glycol, alicyclic glycols such as cyclohexane dimethanol, and aromatic dihydroxy compounds such as bisphenol and at least one dicarboxylic acid selected from the group consisting of aromatic dicarboxylic acid such as terephthalic acid, isophthalic acid, and 2,6-naphthalene dicarboxylic acid, aliphatic dicarboxylic acids such as oxalic acid, succinic acid, adipic acid, sebacic acid, and undecadicarboxylic acid, and alicyclic dicarboxylic acids such as tetrahydroterephthalic acid. These polyesters can be modified with a small amount of tri or more polyhydroxy compounds and polycarboxlic acids such as triols and tricarboxylic acids as long as the modified resins are thermoplastic. These polyesters can be used alone or in any mixture thereof in the present thermoplastic resin composition.

Typical examples of the above-mentioned polyesters are polyethylene terephthalate, polybutylene terephthalate, and polyethylene isophthalate-terephthalate copolymer.

The polycarbonates usable in the present thermoplastic resin compositions are high molecular weight polymers having carbonate ester linkages in the molecule backbone chains thereof, especially those obtained from aromatic dioxy compounds (or bisphenols) such as bisphenol A. These polycarbonates also can be used alone or in any mixture thereof in the present thermoplastic resin composition.

The ultra-high molecular weight polyolefin powder usable as component (B) in the present thermoplastic resin compositions includes homopolymers of, for example, ethylene, propylene, 1-butene, and 4-methyl-1-pentene, copolymers of ethylene with a small amount of the other alpha-olefin of olefins such as propylene, 1-butene, 1-hexene, 1-octene, and 4-methyl-1-pentene, and the modified products thereof, preferably the ethylene homopolymers and copolymers and the modified products thereof.

The above-mentioned ultra-high molecular weight polyolefin powder should have an intrinsic viscosity $[\eta]$, measured in decalin at 135° C., of 10 dl/g or more, preferably 13 to 50 dl/g, and more preferably 15 to 30 dl/g. When a polyolefin powder having an intrinsic viscosity of less than 10 dl/g is used, the improvement of the mechanical strength characteristics such as the abrasion resistance and the critical PV value is less, due to the low molecular weight of the polyolefin.

The above-mentioned ultra-high molecular weight polyolefin powder must have the specified particle size. That is, the average diameter of the polyolefin powder must be 80 μm or less, preferably 1 to 80 μm, more preferably 3 to 60 μm, and especially 3 to 40 μm. Furthermore, the particle size distribution of the polyolefin powder must be such that substantially all (e.g., 95% or more) of the powder particles will pass through a sieve having a sieve number of 100 (i.e., a 100 mesh sieve) and at least 20% by weight, preferably 50% by weight, of the total powder particles will pass through a sieve having a sieve number of 350. (i.e., a 350 mesh sieve).

When the size of the polyolefin powder particles used is such that the particles will not pass through a 100 mesh sieve, the powder particles are isolated as large particles in the matrix of the above-mentioned thermoplastic resin (A) even when the polyolefin powder is melt mixed with the thermoplastic resin. As a result, the resultant polymer composition has bad distribution conditions and, therefore, has poor impact strength and tensile characteristics.

When the average particle size of the polyolefin powder particles is more than 80 μm, the dispersibility of the polyolefin powder(B), in the thermoplastic resin (A) is poor and, therefore, the desired improvements in the abrasion resistance, the impact resistance, the tensile characteristics, and the critical PV value of the resultant resin compositions cannot be obtained. On the other hand, although there is no critical limitation in the lower limit of the average particle size of the polyolefin powder, polyolefin powder particles having a too small size are not preferable because the handling of the powder particles and the uniform mixing thereof with the thermoplastic resin becomes difficult due to the low bulk density of the fine powder particles of the polyolefin powder.

The ultra-high molecular weight polyolefin powder used in the present invention can be of any shape, for example, in the form of spheres, flat spheres, ovals, and clusters of small spheres resembling a bunch of grapes.

Although there are no critical limitations in the bulk density and angle of repose of the polyolefin powder (B), the bulk density of the polyolefin powder is preferably 0.10 to 0.45 g/cm$^3$, more preferably 0.15 to 0.40 g/cm$^3$, and the angle of repose is preferably 30° to 80°, more preferably 40° to 60°.

The ultra-high molecular weight polyolefin powder, especially polyethylene powder, modified by the inclusion of at least one polar group such as an acid group, an ester group, an amide group, an acid anhydride group, or an epoxide groups can be preferably used as component (B) in the present thermoplastic resin composition, as the affinity of the polyolefin powder to the above-mentioned thermoplastic resins (A) is improved and, therefore, the mechanical strength is further improved. The inclusion of these polar groups in the polyolefin powder can be effected by, for example, graft copolymerizing graft monomers having the polar groups to the ultra-high molecular weight polyolefin powder (B).

Examples of the above-mentioned graft monomers having the polar groups are unsaturated carboxylic acids such as acrylic acid, methacrylic acid, maleic acid, fumaric acid, itaconic acid, citraconic acid, crotonic acid, endocis-bicyclo[2,2,1]hepto-5-ene-2,3-dicarboxylic acid and bicyclo-[2,2,1]hepto-2-ene-5,6-dicarboxylic acid, and the derivatives of these acids such as their acid halides, amides, imides, anhydrides, esters, and salts. Examples of these derivatives are malenyl chloride, maleimide, acrylic amide, methacrylic amide, glycidyl methacrylate, maleic anhydride, itaconic anhydride, citraconic anhydride, bicyclo[2,2,1]hepto-2-ene-5,6-dicarboxylic acid anhydride, monomethyl maleate, dimethyl maleate, glycidyl maleate, dimethyl fumarate, diethyl itaconate, dimethyl citraconate, dimethyl bicyclo[2,2,1]hepto-2-ene-5,6-dicarboxlate, methyl acrylate, methyl methacrylate, glycidyl acrylate, sodium acrylate, sodium methacrylate, potassium methacrylate, disodium maleate, dipotassium maleate, monosodium maleate, disodium fumarate, dilithium itaconate, diammonium citraconate, and disodium bicyclo[2,2,1]hepto-2-ene- 5,6-dicarboxylate.

Although there is no critical limitation in the content of the polar group units (or the units derived from the unsaturated carboxylic acid derivatives) in the modified ultra-high molecular weight polyolefin powder, the content of the polar group units in the polyolefin powder is preferably 0.01 to 10 parts by weight, more preferably 0.02 to 5 parts by weight, based on 100 parts by weight of the ultra-high molecular weight polyolefin powder.

The graft copolymerization of the above-mentioned graft monomers having the polar groups to the ultra-high molecular weight polyolefin powder (B) can be carried out in any conventional manner. For example, since the ultra-high molecular weight polyolefin powder (B) is only slightly soluble in solvents and also has a high melt viscosity, the graft polymerization is generally carried out in the presence of a radical initiator by dispersing the polyolefin powder in a solvent. The graft monomers are preferably used in an amount of 0.02 to 50 parts by weight based on 100 parts by weight of the polyolefin powder. Examples of such solvents are aromatic hydrocarbons such as benzene, toluene, and xylene, halogenated hydrocarbons such as chlorobenzene, dichlorobenzene, bromobenzene, trichloroethane, dichloroethane, and carbon tetrachloride, alicyclic hydrocarbons such as cyclohexane and cyclooctane, and aliphatic hydrocarbons such as pentane, hexane, heptane, octane, and decane. Examples of the radical initiators usable in the graft copolymerization are organic peroxides such as dialkyl peroxides, diaralkyl peroxides, diacyl peroxides, organic peracids, organic peracid esters, and alkyl hydroperoxides, aralkyl peroxides, the radical initiators are preferably used in an amount of 0.05 to 10 parts by weight based on 100 parts by weight of the polyolefin powder. The graft copolymerization is usually carried out at a temperature of, for example, 30° C. to 120° C., preferably 50° C. to 110° C. After the graft copolymerization, the resultant mixture is filtered, washed, and dried in a conventional manner. Thus, the desired modified ultra-high molecular weight polyolefin powder can be obtained. According to this method, ultra-high molecular weight polyolefin powder can be modified without substantially changing the shapes and sizes of the starting polyolefin powder. The modified ultra-high molecular weight polyolefin powder thus obtained has an excellent dispersibility in various resins and inorganic fillers, and has excellent powder flowability of fluidity and easy handling characteristics. Accordingly, this polyolefin powder can be suitably used for modifying the physical properties and surface appearance of the molded products and also can be used as adhesives for joining resins to metals.

The ultra-high molecular weight polyolefin powder usable as component (B) or as a starting material for preparing the above-mentioned modified polyolefin powder can be prepared by a method disclosed, for example, in Japanese Patent Application No. 58-213229, filed Nov. 15, 1983. That is, the ultra-high molecular weight polyolefin powder having an intrinsic viscosity [$\eta$] of 10 dl/gr or more, mesured in decalin at 135° C. and having an average particle size of 80 $\mu$m or less and having such a particle size distribution that substantially all of the powder particles pass through a sieve having an opening size of 100 meshes and at least 20% by weight of the total powder particles passes through a sieve having an opening size of 350 meshes can be prepared by, for example, the following methods:

(1) Olefins are polymerized in the presence of the specified Ziegler catalysts under the specified conditions to prepare the ultra-high molecular weight polyolefin slurry, followed by filtration and washing.

(2) Olefins are polymerized in the presence of the specified Ziegler catalysts under the specified conditions to prepare the ultra-high molecular weight polyolefin powder slurry, followed by a high speed shearing treatment.

(3) The above-mentioned specified Ziegler catalysts are first subjected to a high speed shearing treatment. In the presence of the resultant finely dispersed type Ziegler catalyst, olefins are polymerized under the specified conditions to directly prepare the ultra-high molecular weight polyolefin powder. The resultant ultra-high molecular weight polyolefin powder can optionally and advantageously be subjected, as a slurry, to a high speed shearing treatment to obtain the ultra-high molecular weight polyolefin powder having excellent shapes and properties.

According to the above-mentioned method (1), the ultra-high molecular weight polyolefin powder in the form of clusters of small spheres generally having an average powder particle diameter of 3 to 80 $\mu$m, preferably 5 to 40 $\mu$m and having such a particle size distribution that generally 20% by weight or more, preferably 30% by weight or more of the powder particles passes through a sieve having an opening size of 350 meshes can be obtained. On the other hand, according to the above-mentioned methods (2) and (3), the ultra-high molecular weight polyolefin powder in the form of substantially spherical particles having an average particle diameter of generally 1 to 50 $\mu$m, preferably 3 to 30 $\mu$m and having such a particle size distribution that generally 50% by weight or more, preferably 80% by weight or more, of the powder particles passes through a sieve having an opening size of 350 meshes can be obtained.

The above-mentioned methods (1) to (3) will now be explained more specifically. The specified Ziegler catalysts used in the methods (1) to (3) are those basically composed of a solid titanium catalyst component and an organoaluminum compound catalyst component. The solid titanium catalyst component of the catalysts, especially those used in the above-mentioned method (1) is preferably a highly active very fine catalyst component having a narrow particle size distribution and having an average particle diameter of about 0.1 to 0.5 $\mu$m and also having a such shape that several fine spheres are adhered to each other. This highly-active titanium catalyst component in the form of fine sphere particles can be prepared by contacting liquid megnesium compounds with liquid magnesium compounds under certain conditions to presipitate the solid products (see Japanese Unexamined Patent Publication (Kokai) No. 56-811). For example, when a hydrocarbon solution of magnesium chloride and a higher alcohol is mixed with titanium tetrachloride at a low temperature, followed by heating the mixture to about 50° C. to about 100° C. to precipitate the solid product, a very small amount, e.g., about 0.01 to 0.2 mol based on 1 mol of the magnesium chloride, of an ester of monocarboxylic acid is also present in the system and the precipitation is carried out under very strong agitation conditions. In this case, the titanium tetrachloride can be optionally washed if necessary. Thus, the desired solid titanium catalyst component can be obtained. The preferable solid titanium catalyst component contains about 1 to 6% by weight of titanium, an atomic ratio of halogen/titanium of about 5 to 90, and an atomic ratio of magnesium/ titanium of about 4 to 50.

The solid titanium catalyst component of the Ziegler catalysts used in the above-mentioned method (3) is preferably a highly active titanium catalyst component in the form of very fine spherical powder having a narrow particle size and having an average particle diameter of 0.01 μm to 5 μm, preferably 0.05 μm to 3 μm. This highly active titanium catalyst component can be obtained by shear treating, at a high speed, the solid titanium catalyst component slurry prepared in the above-mentioned method (1). The high speed shearing treatment can be carried out by treating the solid titanium catalyst component slurry under an inert gas atmosphere for an appropriate time in a commercially available homomixer. An organoaluminum compound in an equimolar amount to the titanium can also be previously added to the system during the shearing treatment to prevent the decrease in the performance of the catalyst. Furthermore, the slurry after the treating can be filtered by a sieve to remove the coarse granules from the treated slurry. Thus, the desired highly active fine powder titanium catalyst component can be obtained.

The desired ultra-high molecular weight polyolefin used in the present invention can be generally prepared by slurry polymerizing olefin in the presence of the above-prepared highly active titanium catalyst component in the form of fine powder and an organoaluminum compound catalyst component such as trialkyl aluminum (e.g., triethyl aluminum and triisobutyl aluminum), dialkylaluminum chloride (e.g., diethylaluminum chloride and dialkylaluminum chloride), and alkylaluminum sesquichloride (e.g., ethylaluminum sesquichloride), or any mixture thereof. The polymerization can be carried out, optionally further in the presence of an electron donor, in a hydrocarbon solvent medium such as pentane, hexane, heptane or kerosine at a temperature of 50° C. to 90° C. The preferable amount of the catalyst in the polymerization is that the concentration of the titanium catalyst component, in terms of an atomic titanium, of about 0.001 to 1.0 mmol/liter and that the atomic ratio of Al/Ti is 5 to 500. The slurry concentration of the polyolefin in the polymerization system is preferably 50 to 400 g/liter. The desired intrinsic viscosity of the ultra-high molecular weight polyolefin can be obtained by adjusting a polymerization temperature or a very small amount of hydrogen.

The ultra-high molecular weight polyolefin powder used in the present invention can be obtained, according to the above-mentioned method (2) or, if desired, the above-mentioned method (3), by shear treating the above-prepared ultra-high molecular weight polyolefin powder in the form of slurry at a high speed. The high speed shearing tyreatment can be carried out by using, for example, a granulator such as a commercially available homomic line mill.

The thermoplastic resin composition according to the present invention can be prepared by melt blending 98% to 70% by weight, preferably 97% to 80% by weight, of the above-mentioned thermoplastic resin (A) with 2% to 30% by weight, preferably 3% to 20% by weight, of the above-mentioned ultra-high molecular weight polyolefin powder (B) in any conventional manner.

When the amount of component (B) is less than 2% by weight, the desired improvements in the abrasion resistance, impact resistance, and critical PV value of the resultant thermoplastic resin composition cannot be effected. Contrary to this, when the amount of component (B) is more than 30% by weight, the melt flowability of the resultant composition is decreased, causing difficulties in the injection molding process and largely impairing the inherent properties or characteristics of the thermoplastic resin (A).

The melt blending of the components (A) and (B) can be carried out at a temperature, for example, higher than the melting points of the components (A) and (B), preferably at a resin temperature of 200° C. to 300° C., more preferably 200° C. to 270° C., by using any mixing or blending device such as a single screw extruder, a twin screw extruder, or a Banbury mixer. The use of a twin screw extruder is preferable for a more effective dispension of both the components (A) and (B).

The thermoplastic resin composition according to the present invention can optionally contain any conventional ingredients or additives, as long as the objects of the present invention are not impaired. Examples of such optional ingredients are heat stabilizers, weathering stabilizers, lubricants, nucleating agents, antistatic agents, flame retarding agents, pigments, dyes, and inorganic and organic fillers.

Since the thermoplastic resin compositions according to the present invention have excellent abrasion resistance and impact resistance, and high critical PV values, when compared with conventional thermoplastic resin compositions, the present thermoplastic resin compositions can be advantageously used in the manufacture of mechanical parts such as oilless bearings and gears.

The above-mentioned modified ultra-high molecular weight polyolefin powder usable as component (B) of the present thermoplastic can also be used as a raw plastic material for producing molded articles having various shapes by any conventional molding method, such as an injection molding process and a compression molding process. Furthermore, the modified polyolefin powder can be coated as a coating composition on various surfaces by, for example, an electrostatic coating process. In the above cases, the modified polyolefin powder may be blended with various ingredients or additives usually used in conventional polyolefin compositions.

The above-mentioned modified polyolefin powder can be suitably blended with a relatively large amount, for example, 10% to 70% by weight, preferably 20% to 50% by weight based on the modified polyolefin powder, of inorganic fillers. Examples of such inorganic fillers are carbon black, graphite carbon, silica, talc, clay, calcium carbonate, magnesium oxide, magnesium hydroxide, alumina, aluminum hydroxide, hydrothalsite, zinc oxide, titanium oxide, glass, ceramics, boron compounds (e.g., $B_2O_3$, $B_4C$), glass fiber, carbon fiber, titanium fiber, and other whiskers. Of these inorganic fillers, those having an average diameter of 0.1 to 30 μm, more preferably 0.1 to 10 μm, are preferably used in the blending with the above-mentioned modified polyolefin powder.

When the above-mentioned modified ultra-high molecular weight polyolefin powder is blended with inorganic fillers, the molded articles obtained therefrom exhibit excellent visual appearance and physical properties, due to the high loading capacity and excellent dispersibility of the present modified polyolefin powders. Furthermore, when the present modified polyolefin powder is used as an adhesive and coating composition for metals, excellent adhesive properties to metals and an excellent visual appearance (e.g., surface gloss) can be obtained.

EXAMPLES

The present invention will now be further illustrated by, but is by no means limited to, the following examples, in which all percentages and all parts are expressed on a weight basis unless otherwise specified.

The physical properties of the resin compositions obtained in the following Examples and Comparative and Reference Examples were determined as follows:

(1) Tensile test: Tensile strength at break (TS: kg/cm$^2$) and elongation at break (EL: %) were determined according to the ASTM D-638 method in which an ASTM #4 specimen was used and the pulling rate was 50 mm/min.

(2) Izod impact strength: IZOD (kg.cm/cm) was determined according to the ASTM D-256 method in which the thickness of a specimen with a notch was 3.2 mm.

(3) Taber abrasion test: Abrasion loss (mg) was determined by the JIS K-6902 method in which the abrasion loss (mg) per 1000 rotations was measured in a Taber abrader provided with an H-22 abrading ring.

(4) Critical PV value: Critical PV (kg/cm$^2$.m/sec) was determined from the load at which a specimen was melted by frictional heat when the load (P) was increased at a step of 0.2 kg/cm$^2$ under a peripheral speed of 0.2 m/sec in a friction abrading test machine (Model EFM-III manufactured by Toyo Baldwin Co., Ltd.). A stainless steel plate (SUS-304) was used as a friction surface.

EXAMPLE 1

Preparation of Ultra-high Molecular Weight Polyethylene Powder (1) Synthesis of Catalyst A 47.6 g (0.5 mol) amount of anhydrous magnesium chloride, 0.25 liters of decane, and 0.23 liters (1.5 mol) of 2-ethylhexyl alcohol were reacted at a temperature of 130° C. for 2 hours to form a homogeneous solution. 7.4 ml (50 mmol) of ethyl benzoate was added to the resultant homogeneous solution, while stirring. The solution was added dropwise to 1.5 liters of TiCl$_4$ maintained at a temperature of −5° C. in a 3 liter glass separable flask for 1 hour while stirring at 950 r.p.m. After the dropwise addition, the mixture was heated to a temperature of 90° C. and was allowed to react at 90° C. for 2 hours. After completion of the reaction, the solid portion was collected by filtration, followed by thoroughly washing with hexane. Thus, a highly active titanium catalyst component having a titanium content of 3.9% in the form of a fine powder was obtained.

(2) Polymerization

Ten liters of n-hexane, 10 mmols of triethyl aluminum and 0.2 mmol, in terms of titanium atom, of the above-prepared titanium catalyst component were added to a polymerization vessel having an inner volume of 35 liters under an inert gas atmosphere, and the content of the polymerization vessel was then heated to a temperature of 70° C. Gaseous ethylene was introduced into the polymerization vessel at a feed rate of 1 Nm$^3$/hr. The polymerization was carried out at a polymerization pressure of 1 to 2 kg/cm$^2$G, while the polymerization temperature was controlled to 70° C. by jacket cooling. After 1 hour, the ethylene feed was stopped and the polymerization vessel was cooled and degassed. The resultant polyethylene was separated from the solvent system by filtration and was then dried in vacuo at a temperature of 70° C. under an N$_2$ gas atmosphere.

Thus, 1.2 kg of polyethylene having an intrinsic viscosity of 22 dl/g, measured in decalin at 135° C., was obtained. The resultant polyethylene was in the form of grape-like clusters of small spheres, having a size of 5 to 10 μm, melt-combined with each other. The average particle size D$_{50}$ was 30 μm and the particle size distribution was such that all of the powder particles passed through a 100 mesh sieve and 75% of the powder particles passed through a 350 mesh sieve. The bulk density of the polyethylene powder was 0.19 g/cm$^3$.

EXAMPLE 2

Preparation of Modified Ultra-High Molecular Weight Polyethylene Powder

A 2500 g amount of the ultra-high molecular weight polyethylene powder (i.e., HPE) prepared in Example 1 and 50 liters of toluene were added to a polymerization vessel having an inner volume of 100 liters and heated to a temperature of 85° C. Then, 30 parts, based on 100 parts of HPE, of maleic anhydride and 3 parts, based on 100 parts of HPE, of benzoyl peroxide were introduced to the polymerization vessel over a period of 4 hours while stirring, and the reaction mixture stirred for a further 2 hours. Thus, the reaction was carried out for 6 hours in total.

After the completion of the reaction, the reaction mixture was washed with acetone to remove the unreacted maleic anhydride and the peroxide decomposition product therefrom, and then dried.

The resultant ultra-high molecular weight polyethylene powder modified with maleic anhydride (i.e., MAH.HPE) had a maleic anhydride graft percentage of 0.1%, and the characteristics of the powder particles were the same as those of HPE before the reaction.

EXAMPLES 3 to 5

90%, 80%, and 70% of nylon 6 (AMILAN ® CM-1001 available from Toray Co.: "NY-6") as component (A) were mixed with 10%, 20%, and 30% of MAH.HPE prepared in Example 2 as component (B), respectively, in a Henschel mixer. The mixtures were then melt blended at a resin temperature of 240° C. in a twin-screw extruder (ZSK-53L manufactured by Werner and Pfleiderer) to obtain resin compositions I, II, and III, respectively. The physical properties of these resin compositions I, II, and III were evaluated by using specimens prepared from the resin compositions I, II, and III by an injection molding machine (IS-50 manufactured by Toshiba Machine Co., Ltd.)

The results are shown in Table 1.

COMPARATIVE EXAMPLE 1

The resin composition was prepared and evaluated in the same manner as in Example 4 (i.e., Component A: 80%, Component B: 20%), except that a commercially available ultra-high molecular weight polyethylene powder (HIZEX ® MILLION 340M manufactured by Mitsui Petrochemical Industries, Ltd., Intrinsic viscosity: 22dl/g, Average particle size D$_{50}$: 200 μm, 100 mesh sieve passing: 50%, 350 mesh sieve passing: 0%) was used in lieu of MAH.HPE.

The results are shown in Table 1.

REFERENCE EXAMPLE 1

The polyamide (NY-6) used in Example 3 was evaluated in the same manner as in Example 3.
The results are shown in Table 1.

EXAMPLES 6 to 8

Resin compositions were prepared and evaluated in the same manner as in Examples 3 to 5, except that polyacetal (DURACON ® manufactured by Polyplastic Co., Ltd., "POM") was used in lieu of NY-6.
The results are shown in Table 1.

COMPARATIVE EXAMPLE 2

A resin composition was prepared and evaluated in the same manner as in Comparative Example 1, except that the POM used in Example 6 was used in lieu of NY-6 used in Comparative Example 1.
The results are shown in Table 1.

REFERENCE EXAMPLE 2

The polyacetal (POM) used in Example 6 was evaluated in the same manner as in Example 6.
The results are shown in Table 1.

EXAMPLE 9

A resin composition was prepared and evaluated in the same manner as in Example 3, except that polyethylene terephthalate (Mitsui PET J015 manufactured by Mitsui PET Resin Co., Ltd., "PET") was used in lieu of NY-6 used in Example 3 and that 95% of PET and 5% of MAH.HPE were melt blended.
The results are shown in Table 1.

COMPARATIVE EXAMPLE 3

A resin composition was prepared and evaluated in the same manner as in Example 9, except that the ultra-high molecular weight polyethylene powder "340M" used in Comparative Example 1 was used in lieu of MAH.HPE used in Example 9.
The results are shown in Table 1.

REFERENCE EXAMPLE 3

The polyethylene terephthalate "PET" used in Example 9 was evaluated in the same manner as in Example 9.
The results are shown in Table 1.

EXAMPLE 10

A resin composition was prepared and evaluated in the same manner as in Example 3, except that a polycarbonate (DANLITE ® L-1250 manufactured by Teijin Chemicals Ltd.: "PC") in lieu of MAH.HPE used in Example 3 and that 97% of PC and 3% of MAH.HPE were melt blended.
The results are shown in Table 1. In this Example, an Izod impact test was also conducted on a specimen having a thickness of 6.4 mm.

COMPARATIVE EXAMPLE 4

A resin composition was prepared and evaluated in the same manner as in Example 10, except that the ultra-high molecular weight polyethylene powder "340M" used in Comparative Example 1 was used in lieu of MAH.HPE used in Example 10.
The results are shown in Table 1.

Reference Example 4

The polycarbonate "PC" used in Example 10 was evaluated in the same manner as in Example 10.
The results are shown in Table 1.

EXAMPLE 11

A resin composition was prepared and evaluated in the same manner as in Example 4, except that the HPE prepared in Example 1 (i.e., non-modified ultra-high molecular weight polyethylene) was used in lieu of MAH.HPE used in Example 4.
The results are shown in Table 1.

TABLE 1

| No. | Composition (%) | Tensile test TS (kg/cm$^2$) | Tensile test EL (%) | IZOD (kg·cm/cm) | Abrasion (mg) | Critical PV (kg/cm$^2$·m/sec) |
| --- | --- | --- | --- | --- | --- | --- |
| Example 3 | NY-6/MAH.HPE: 90/10 | 500 | 30 | 5.5 | 106 | 1.2 |
| Example 4 | NY-6/MAH.HPE: 80/20 | 430 | 23 | 8.0 | 97 | 1.5 |
| Example 5 | NY-6/MAH.HPE: 70/30 | 390 | 20 | 12.0 | 90 | 2.5 |
| Comparative Example 1 | NY-6/340M: 80/20 | 210 | 12 | 5.2 | 96 | 1.2 |
| Reference Example 1 | NY-6 | 850 | 45 | 4.3 | 140 | 0.8 |
| Example 6 | POM/MAH.HPE: 90/10 | 390 | 4 | 7.0 | 204 | 4.0 |
| Example 7 | POM/MAH.HPE: 80/20 | 270 | 3 | 7.5 | 186 | 5.5 |
| Example 8 | POM/MAH.HPE: 70/30 | 250 | 3 | 8.0 | 173 | 7.0 |
| Comparative Example 2 | POM/340M: 80/20 | 150 | 2 | 5.5 | 193 | 4.8 |
| Reference Example 2 | POM | 640 | 24 | 6.5 | 229 | 2.6 |
| Example 9 | PET/MAH.HPE: 95/5 | 740 | 7 | 2.7 | 210 | 2.8 |
| Comparative Example 3 | PET/340M: 95/5 | 635 | 3 | 2.5 | 215 | 1.5 |
| Reference Example 3 | PET | 760 | 3 | 2.6 | 235 | 0.9 |
| Example 10 | PC/MAH.HPE: 97/3 | 730 | 65 | Not broken /24* | 230 | 0.8 |
| Comparative Example 4 | PC/340M: 97/3 | 680 | 45 | 90/12* | 240 | 0.5 |
| Reference Example 4 | PC | 763 | 84 | 86/10* | 224 | 0.7 |
| Example 11 | NY-6/HPE: 80/20 | 340 | 16 | 5.7 | 97 | 1.4 |

*3.2 mm thick/6.4 mm thick

EXAMPLE 12

A 2500 g amount of HPE having an intrinsic viscosity [η], measured in decalin at 135° C., of 23.3 dl/g, an average particle size of 26 μm, a 350 mesh sieve passing of 65%, a bulk density of 0.28 g/cm3, and an angle of repose of 50° and 50 liters of toluene were charged into a polymerization reactor having an inner volume of 100 liters and the mixture was heated to a temperature of 85° C. Thereafter, 750 g of maleic anhydride in 750 ml toluene solution at 80° C. and 75 g of benzoyl peroxide in 750 ml toluene solution at 20° C. were added over 4 hours, while stirring, to the polymerization reactor and the reaction mixture was stirred for a further 2 hours. Thus, the reaction was carried out for 6 hours in total. After completion of the reaction, the reaction product was washed with acetone to remove the unreacted maleic anhydride and the peroxide decomposition products from the reaction product, followed by drying.

The maleic anhydride graft-modified ultra-high molecular weight polyethylene powder thus obtained had a maleic anhydride graft percentage of 0.1%, an average particle size of 28 μm, and a particle size distribution such that 64% of the powder particles passed through a 350 mesh sieve and that all of the powder particles passed through a 100 mesh sieve. Furthermore, the modified ultra-high molecular weight polyethylene powder was in the form of fine spheres having a bulk density of 0.27 g/cm$^3$ and an angle of repose of 53°.

EXAMPLE 13

An acrylic acid graft-modified ultra-high molecular weight polyethylene powder was prepared in the same manner as in Example 12, except that 300 g of acrylic acid was used in lieu of the maleic anhydride and that the reaction temperature was changed to 90° C.

The acrylic acid graft-modified ultra-high molecular weight polyethylene powder thus obtained had an acrylic acid graft percentage of 0.5%, an average particle size of 28 μm, and a particle size distribution such that 63% of the powder particles passed through a 350 mesh sieve and all of the powder particles passed through a 100 mesh sieve. The modified ultra-high molecular weight polyethene powder was in the form of fine spheres having a bulk density of 0.27 g/cm$^3$ and an angle of repose of 52°.

EXAMPLE 14

A maleic anhydride graft-modified ultra-high molecular weight polyethylene powder was prepared in the same manner as in Example 12, except that an ultra-high molecular weight polyethylene powder having an intrinsic viscosity [η], measured in decalin at 135° C., of 2.1 dl/g, an average powder particle size of 40 μm, a 350 mesh sieve passing of 56%, a bulk density of 0.17 g/cm$^3$, and an angle of repose of 45° was used.

The maleic anhydride graft-modified ultra-high molecular weight polyethylene powder thus obtained had a maleic anhydride graft percentage of 0.1%, an average particle size of 43 μm, and a particle size distribution such that 54% of the powder particles passed through a 350 mesh sieve and that all of the powder particles passed through a 100 mesh sieve. Furthermore, the modified ultra-high molecular weight polyethylene powder was in the form of spheres having a bulk density of 0.16 g/cm$^3$ and an angle of repose of 47°.

EXAMPLE 15

A maleic anhydride graft-modified ultra-high molecular weight polyethylene powder was prepared in the same manner as in Example 12, except that the ultra-high molecular weight polyethylene powder used in Example 14 was used, chlorobenzene was used as the solvent, and the reaction was carried out at a temperature of 95° C.

The maleic anhydride graft-modified ultra-high molecular weight polyethylene powder thus obtained had a maleic anhydride graft percentage of 0.3%, an average particle size of 41 μm, and a particle size distribution such that 53% of the powder particles passed through a 50 mesh sieve and that all of the powder particles passed through a 100 mesh sieve. Furthermore, the modified ultra-high molecular weight polyethylene powder was in the form of spheres having a bulk density of 0.16 g/cm$^3$ and an angle of repose of 46°.

COMPARATIVE EXAMPLE 5

A maleic anhydride graft-modified ultra-high molecular weight polyethylene powder was prepared in the same manner as in Example 12, except that an ultra-high molecular weight polyethylene powder having an intrinsic viscosity [η], measured in decalin at 135° C., of 19.9 dl/g, an average powder particle size of 140 μm, a 350 mesh sieve passing of 3%, a bulk density of 0.41 g/cm$^3$, and an angle of repose of 40° was used.

The maleic anhydride graft-modified ultra-high molecular weight polyethylene powder thus obtained had a maleic anhydride graft percentage of 0.1%, an average particle size of 147 μm, and a particle size distribution such that 3% of the powder particles passed through a 350 mesh sieve and that 18% of the powder particles passed through a 100 mesh sieve. Furthermore, the modified ultra-high molecular weight polyethylene powder was in the form of spheres having a bulk density of 0.42 g/cm3 and an angle of repose of 40°.

EXAMPLE 16

Thermoplastic resin compositions were prepared as follows That is, 80% of thermoplastic resin, nylon-6 (AMILAN ® CM-1001 manufactured by Toray Industries, Inc.) and 20% of the modified polyethylene powder of Example 12 and Comparative Example 5 as well as unmodified ultra-high polyethylene used in Example 12 and Comparative Example 5 (i.e., Reference Example Nos. 5 and 6) were first mixed in a Henschel mixer and then melt blended at a resin temperature of 240° C. in a twin-screw extruder ZSK-53L (manufactured by Werner and Pfleiderer Co., Ltd.).

The resultant compositions were evaluated by using specimens prepared by an injection molding machine IS-50 (manufactured by Toshiba Machine Co., Ltd.). The results are shown in Table 2.

TABLE 2

| No. | Ultra-high molecular weight polyethylene | Tensile test TS (kg/cm$^2$) | EL (%) | IZOD (kg cm/cm) | Abrasion (mg) | Critical PV value (kg/cm$^2$ m/sec) |
|---|---|---|---|---|---|---|
| Example 12 | MAH.HPE | 430 | 23 | 8.0 | 97 | 1.5 |
| Comparative Example 5 | " | 320 | 15 | 5.4 | 96 | 1.3 |
| Reference Example 5 | HPE | 340 | 16 | 5.7 | 97 | 1.3 |
| Reference | " | 210 | 12 | 5.2 | 96 | 1.2 |

TABLE 2-continued

| No. | Ultra-high molecular weight polyethylene | Tensile test TS (kg/cm$^2$) | EL (%) | IZOD (kg cm/cm) | Abrasion (mg) | Critical PV value (kg/cm$^2$ m/sec) |
|---|---|---|---|---|---|---|
| Example 6 | | | | | | |

EXAMPLE 17

A 80% amount of the modified or unmodified ultra-high molecular weight polyethylene powder of Example 12, Comparative Example 5, or Reference Example 5 or 6 was blended in 20% of graphite carbon Cp.S having an average particle size of 4 to 5 μm (manufactured by Nippon Kokuen Co., Ltd.). The resultant blended compositions were press molded to form press sheets each having a thickness of 10 mm. The test specimens were cut out from these sheets.

The physical properties were determined by using these test specimens. The results are shown in Table 3.

TABLE 3

| No. | Ultra-high molecular weight polyethylene | Tensile strength (kg/cm$^2$) | Elongation (%) | Impact strength (kg cm/cm$^2$) |
|---|---|---|---|---|
| Example 12 | MAH.HPE | 320 | 98 | 45 |
| Comparative Example 5 | " | 201 | 30 | 20 |
| Reference Example 5 | HPE | 213 | 68 | 36 |
| Reference Example 6 | " | 165 | 25 | 15 |

Tensile test method
test piece: ASTM #4 Dambell (2 mm thick)
Pulling rate: 50 mm/min
Tensile test machine: Instron Model TTM
Impact strength
Test piece: 3 × 5 × 15 mm size
Test machine: Dynstat Testor (manufactured by Toyo Seiki Seisakusho)
Hammer capacity: 40 kg · cm

EXAMPLE 18

The modified or unmodified ultra-high molecular weight powder of Example 12, Comparative Example 5, or Reference Example 5 or 6 was electrostatically coated on the surface of steel plates, of which the surfaces had been roughened by #150 sand paper, followed by wiping with acetone. The polyethylene powder was baked at a temperature of 200° C. for 20 minutes to obtain films having a thickness of 30 μm.

The results are shown in Table 4.

TABLE 4

| No. | Ultra-high molecular weight polyethylene | Adhesion property (kg/20 mm) | Surface gloss |
|---|---|---|---|
| Example 12 | MAH.HPE | 2.0 | Good |
| Comparative Example 5 | " | " | Poor |
| Reference Example 5 | HPE | Peeled off | Good |
| Reference Example 6 | " | " | Poor |

Tensile test method
Test piece size: 130 L × 20 W × 2 T (mm)
Pulling rate: 50 mm/min
Angle of peeling: 90°

We claim:

1. A thermoplastic resin composition comprising a melt mixed product of (A) 70% to 98% by weight of at least one thermoplastic resin selected from the group consisting of polyamides, polyacetals, polyesters, and polycarbonates and (B) 30% to 2% by weight of an ultra-high molecular weight polyolefin powder having an intrinsic viscosity of at least 12.1 dl/g, measured in decalin at 135° C., and having an average particle size of at most 80 μm and a particle size distribution such that substantially all of the powder particles pass through a sieve having a sieve mesh number of 100 and at least 20% by weight of the total powder particles pass through a sieve having a sieve mesh number of 350.

2. A thermoplastic resin composition as claimed in claim 1, wherein said component (B) is ultra-high molecular weight ethylene homopolymer or ethylene copolar powder.

3. A thermoplastic resin composition as claimed in claim 1, wherein said component (B) is an ultra-high molecular weight polyolefin powder modified by including at least one polar group selected from the group consisting of acid groups, ester groups, amide groups, acid anhydride groups, and epoxide groups.

4. A thermoplastic resin composition as claimed in claim 3, wherein the content of the polar groups unit in the modified polyolefin powder is 0.01 to 10 parts by weight, based on 100 parts by weight of the ultra-high molecular weight polyolefin powder.

5. A thermoplastic resin composition as claimed in claim 3, wherein the component (B) is a modified ultra-high molecular weight polyethylene powder prepared by grafting maleic anhydride to an ultra-high molecular weight polyethylene powder having an intrinsic viscosity of at least 12.1 dl/g, measured in decalin at 135°, and having an average powder particle size of to 80 μm and a particle size distribution such that at least 20% by weight of the total powder particles pass through a sieve having a sieve mesh number of 350.

* * * * *